United States Patent
Yasumatsu (10) Patent No.: US 10,551,727 B2
(45) Date of Patent: Feb. 4, 2020

(54) ILLUMINATION DEVICE AND PROJECTOR

(71) Applicant: SEIKO EPSON CORPORATION, Tokyo (JP)

(72) Inventor: Wataru Yasumatsu, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/890,815

(22) Filed: Feb. 7, 2018

(65) Prior Publication Data

US 2018/0239232 A1 Aug. 23, 2018

(30) Foreign Application Priority Data

Feb. 17, 2017 (JP) ................................. 2017-027922

(51) Int. Cl.
*G03B 21/20* (2006.01)

(52) U.S. Cl.
CPC ....... *G03B 21/2013* (2013.01); *G03B 21/208* (2013.01); *G03B 21/2053* (2013.01); *G03B 21/2066* (2013.01); *G03B 21/2033* (2013.01)

(58) Field of Classification Search
CPC ...... G02B 6/00; G02B 6/0028; G02B 6/0046; G02B 27/0905; G02B 27/0927; G02B 27/283; G02B 19/0028; G02B 19/0057; G03B 21/2013; G03B 21/2033; G03B 21/208; G03B 21/2066; G03B 21/204; G03B 21/00–64; H01S 5/02292; H01S 5/02236; H01S 5/022; H01S 5/405; H04N 9/3161; H04N 9/3164; H04N 9/3152; H04N 9/31–3197; F21V 5/007
See application file for complete search history.

(56) References Cited

U.S. PATENT DOCUMENTS

| 8,891,579 B1* | 11/2014 | Price | H01S 5/02292 |
| | | | 372/107 |
| 2006/0274434 A1* | 12/2006 | Mino | G02B 6/4214 |
| | | | 359/811 |
| 2009/0052189 A1 | 2/2009 | Kon | |

(Continued)

FOREIGN PATENT DOCUMENTS

| JP | 2003-337286 A | 11/2003 |
| JP | 2008-234908 A | 10/2008 |

(Continued)

*Primary Examiner* — Cara E Rakowski
*Assistant Examiner* — Christopher A Lamb, II
(74) *Attorney, Agent, or Firm* — Oliff PLC (57) ABSTRACT

An illumination device of the invention includes a light source unit including light emitting devices having light emission surfaces, a collimating system having collimating lenses provided to respectively correspond to the light emitting devices of the light source unit, into which lights from the respective light emitting devices enter, a collecting lens into which the lights output from the collimating lenses enter, and a rod lens having a light incident end surface into which the light collected by the collecting lens enters. The light source unit and the collimating system are adapted so that a principal ray of the light output from the light emission surface corresponding to a part of the light emitting devices of the light source unit may enter a position separated from an optical axis of the collimating lens corresponding to the part of the light emitting devices of the light source unit.

7 Claims, 8 Drawing Sheets

(56) References Cited

U.S. PATENT DOCUMENTS

| | | | | |
|---|---|---|---|---|
| 2012/0249972 A1* | 10/2012 | Kurosaki | ............ | G03B 21/2013 |
| | | | | 353/31 |
| 2013/0100974 A1* | 4/2013 | Janssens | ............ | G02B 27/0961 |
| | | | | 372/35 |
| 2013/0301013 A1* | 11/2013 | Samejima | .......... | G03B 21/2033 |
| | | | | 353/52 |
| 2016/0077417 A1 | 3/2016 | Ishikawa | | |
| 2016/0085143 A1* | 3/2016 | Hu | .................... | G03B 21/2013 |
| | | | | 362/553 |
| 2017/0227837 A1* | 8/2017 | Okuda | ................ | G03B 21/208 |
| 2017/0284629 A1* | 10/2017 | Kang | ........................ | F21V 5/04 |
| 2017/0363941 A1* | 12/2017 | Sugiyama | ................ | F21K 9/69 |

FOREIGN PATENT DOCUMENTS

| | | |
|---|---|---|
| JP | 2013-238635 A | 11/2013 |
| WO | 2014-196079 A1 | 12/2014 |

\* cited by examiner

ILLUMINATION DEVICE AND PROJECTOR

BACKGROUND

1. Technical Field

The present invention relates to an illumination device and projector.

2. Related Art

Recently, as light source devices for projector, devices using packages containing pluralities of solid light emitting devices are known (for example, see Patent Document 1 (JP-A-2013-238635)). When the package is used, it is desired to homogenize the light intensity distribution in an illuminated area. On the other hand, there is a technology of homogenizing the light intensity distribution on an illuminated area in lights output from the plurality of light emitting devices (for example, see Patent Document 2 (JP-A-2003-337286)).

Accordingly, homogenization of the intensity distribution of the lights output from the package using a rod lens is considered. In this case, on the light incident end surface of the rod lens, the lights output from the respective light emitting devices of the package are superimposed on a single point. Then, the larger amount of light locally enters the light incident end surface of the rod lens and the light incident end surface may be damaged.

SUMMARY

An advantage of some aspects of the invention is to provide an illumination device with reduced damage or the like on a light incident end surface in a rod lens. Another advantage of some aspects of the invention is to provide a projector including the illumination device.

According to a first aspect of the invention, an illumination device is provided. The illumination device includes a light source unit including a plurality of light emitting devices having light emission surfaces, a collimating system having a plurality of collimating lenses provided to respectively correspond to the plurality of light emitting devices of the light source unit, into which lights from the respective light emitting devices enter, a collecting lens into which the lights output from the plurality of collimating lenses enter, and a rod lens having a light incident end surface into which the light collected by the collecting lens enters, wherein the light source unit and the collimating system are adapted so that a principal ray of the light output from the light emission surface corresponding to a part of the plurality of light emitting devices of the light source unit may enter a position separated from an optical axis of the collimating lens corresponding to the part of the plurality of light emitting devices of the light source unit.

According to the illumination device of the first aspect, the position on the light incident end surface into which the principal ray of the light entering the position separated from the optical axis of the collimating lens enters and the position on the light incident end surface into which the principal ray entering onto the optical axis of the collimating lens enters may be made different. Thereby, the respective collection areas formed on the light incident end surface of the rod lens by the lights output from the plurality of light emitting devices do not overlap at a single point. Therefore, overlapping among the collection areas may be suppressed on the light incident end surface, and thus, concentration of the lights on a specific area on the light incident end surface may be prevented and the intensity of the lights on the light incident end surface may be averaged.

Further, the intensity of the lights on the light incident end surface is averaged, and thereby, alteration of an anti-reflection film formed on the light incident end surface may be suppressed. Therefore, reduction of light use efficiency due to the alteration of the anti-reflection film may be suppressed.

In the first aspect, it is preferable that the light source unit further has a substrate and a plurality of supporting members provided on the substrate and respectively supporting the plurality of light emitting devices.

According to this configuration, the supporting members are used, and thereby, the plurality of light emitting devices may be mounted on the substrate in a predetermined arrangement. Therefore, alignment between the collimating system and the light source unit is easier.

In the first aspect, it is preferable that a thickness of a part of the plurality of supporting members is different from thicknesses of the other supporting members.

According to this configuration, the thicknesses of the supporting members are made different, and thereby, the principal ray of the light output from the light emission surface of the part of the plurality of light emitting devices may be entered into the position separated from the optical axis of the collimating lens.

In the first aspect, it is preferable that, of intervals at which the plurality of supporting members are placed, a part of the intervals is different from the other intervals.

According to this configuration, the intervals at which the supporting members are placed may be made different, and thereby, the principal ray of the light output from the light emission surface of the part of the plurality of light emitting devices may be entered into the position separated from the optical axis of the collimating lens.

In the first aspect, it is preferable that, in the collimating system, of intervals at which the plurality of collimating lenses are placed, a part of the intervals is different from the other intervals.

According to this configuration, the intervals at which the collimating lenses are placed may be made different, and thereby, the principal ray of the light output from the light emission surface of the part of the plurality of light emitting devices may be entered into the position separated from the optical axis of the collimating lens.

In the first aspect, it is preferable that, in the light source unit, of intervals at which the plurality of light emitting devices are placed, a part of the intervals is different from the other intervals.

According to this configuration, the intervals at which the light emitting devices are placed may be made different, and thereby, the principal ray of the light output from the light emission surface of the part of the plurality of light emitting devices may be entered into the position separated from the optical axis of the collimating lens.

In the first aspect, it is preferable that the light source unit further has a plurality of prisms provided to respectively correspond to the plurality of light emitting devices and including reflection surfaces that reflect and enter the lights from the light emitting devices into the corresponding collimating lenses, and, of intervals at which the plurality of prisms are placed, a part of the intervals is different from the other intervals.

According to this configuration, the intervals at which the prisms are placed may be made different, and thereby, the principal ray of the light output from the light emission surface of the part of the plurality of light emitting devices may be entered into the position separated from the optical axis of the collimating lens.

Further, with the prisms, the traveling directions of the lights output from the light emitting devices may be changed.

In the first aspect, it is preferable that the light source unit and the rod lens are placed so that a short side direction of a plurality of collection areas formed on the light incident end surface in a rectangular shape by the lights output from the respective light emission surfaces in rectangular shapes and a long side direction of the light incident end surface may be parallel.

According to this configuration, the collection areas are formed on the light incident end surface of the rod lens so that the short side direction of the collection areas and the long side direction of the light incident end surface may be parallel. Therefore, for example, the movement direction of the collection areas is set in the long side direction of the light incident end surface, and thereby, the amounts of movement of the respective collection areas may be taken to be larger. Therefore, on the light incident end surface, overlapping among the respective collection areas may be prevented, and thus, the intensity of the lights on the light incident end surface may be averaged. Further, alteration of the anti-reflection film formed on the light incident end surface may be suppressed, and thus, reduction of light use efficiency due to the alteration of the anti-reflection film may be suppressed.

According to a second aspect of the invention, projector is provided, the projector includes the illumination device according to the first aspect described above, a light modulation device that modulates a light from the illumination device according to image information to form an image light, and a projection system that projects the image light.

The projector according to the second aspect includes the illumination device according to the first aspect, and thereby, with secured reliability of the anti-reflection film provided on the light incident end surface of the rod lens, a pencil of light may be stably radiated to the rod lens and an illumination light may be stably generated. Therefore, images with stable brightness may be projected.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained in detail with reference to the drawings.

Note that, in the drawings used in the following description, for ease of understanding of the features, the characteristic parts may be enlarged for convenience and the dimension ratios between the respective component elements are not necessarily the same as those of real ones.

First Embodiment

Figure 1:
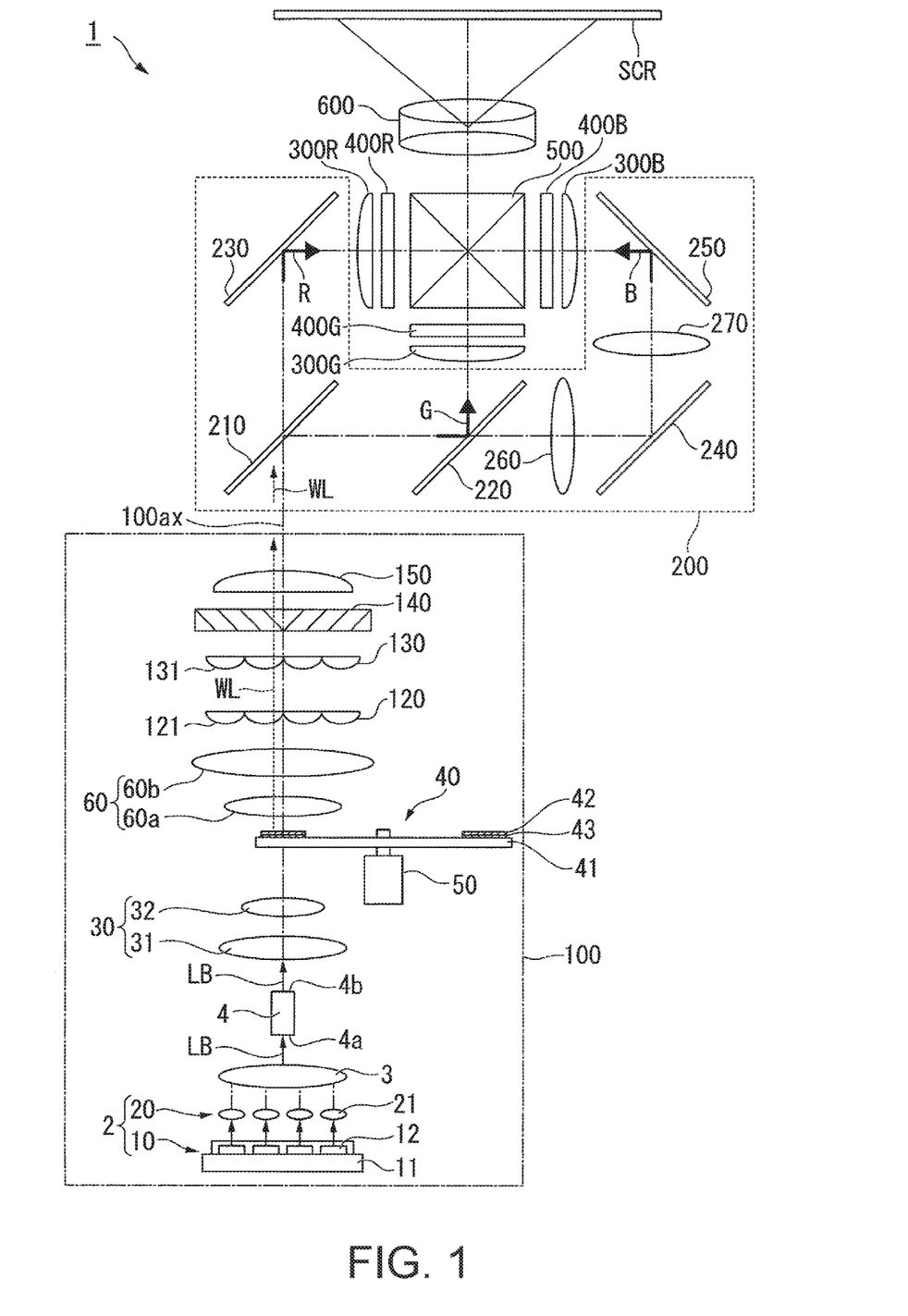
FIG. 1 shows a schematic configuration of a projector according to the first embodiment.

First, a projector according to the embodiment is explained. FIG. 1 shows a schematic configuration of a projector 1 of the embodiment.

As shown in FIG. 1, the projector 1 includes an illumination device 100, a color separation and light guiding system 200, light modulation devices 400R, 400G, 400B, a cross dichroic prism 500, and a projection system 600.

In the embodiment, the illumination device 100 outputs white light WL containing a red light (R), a green light (G), and a blue light (B).

The color separation and light guiding system 200 includes dichroic mirrors 210, 220, reflection mirrors 230, 240, 250, and relay lenses 260, 270. The color separation and light guiding system 200 separates the white light WL from the illumination device 100 into the red light R, the green light G, and the blue light B, and guides the red light R, the green light G, and the blue light B to the respectively corresponding light modulation devices 400R, 400G, 400B.

Field lenses 300R, 300G, 300B are provided between the color separation and light guiding system 200 and the light modulation devices 400R, 400G, 400B.

The dichroic mirror 210 is a dichroic mirror that passes the red light component and reflects the green light component and the blue light component.

The dichroic mirror 220 is a dichroic mirror that reflects the green light component and passes the blue light component.

The reflection mirror 230 is a reflection mirror that reflects the red light component.

The reflection mirrors 240, 250 are reflection mirrors that reflect the blue light component.

The light modulation devices 400R, 400G, 400B include liquid crystal panels that modulate entering color lights according to image information and form images. The operation modes of the liquid crystal panels are not particularly limited to, but include a TN mode, VA mode, transverse field mode.

The light modulation devices 400R, 400G, 400B respectively have light incident-side polarizers (not shown) provided on light incident surface sides and light exiting-side polarizers (not shown) provided on light exiting surface sides.

The cross dichroic prism 500 combines the respective image lights output from the respective light modulation devices 400R, 400G, 400B and forms a color image.

The cross dichroic prism 500 has a nearly square shape in the plan view formed by bonding of four rectangular prisms and dielectric multilayer films are formed on the interfaces in a nearly X-shape on which the rectangular prisms are bonded.

The color image output from the cross dichroic prism 500 is enlarged and projected by the projection system 600 and forms an image on a screen SCR.

Illumination Device

Next, a configuration of the illumination device 100 of the embodiment will be explained.

As shown in FIG. 1, the illumination device 100 includes a light source device 2, a collecting lens 3, a rod lens 4, a collecting system. 30, a rotary fluorescent plate 40, a pickup system 60, a first lens array 120, a second lens array 130, a polarization conversion element 140, and a superimposing lens 150.

The detailed configurations of the light source device 2, the collecting lens 3, and the rod lens 4 will be described later.

The collecting system 30 includes a first lens 31 and a second lens 32. The collecting system 30 is provided in an optical path from the light source device 2 to the rotary fluorescent plate 40, and nearly collects and enters a pencil of light LB as an excitation light into a fluorescent material layer 42. The first lens 31 and the second lens 32 are formed using convex lenses.

The rotary fluorescent plate 40 includes the fluorescent material layer 42 provided on a circular plate 41 rotatable by a motor 50 along the circumferential direction of the circular plate 41. The circular plate 41 is formed using a material that transmits blue light. As the material of the circular plate 41, e.g. quartz glass, quartz crystal, sapphire, optical glass, transparent resin, or the like may be used.

The pencil of light LB output from the light source device 2 enters the fluorescent material layer 42 from the circular plate 41 side. The fluorescent material layer 42 is excited by the pencil of light LB. The fluorescent material layer 42 converts a part of the pencil of light LB from the light source device 2 into a fluorescent light and passes the rest of the pencil of light LB without conversion. The fluorescent material layer 42 includes a layer containing e.g. $(Y,Gd)_3(Al,Ga)_5O_{12}$:Ce as a YAG fluorescent material.

A dichroic film 43 that transmits the pencil of light LB of a blue laser beam and reflects the fluorescent light is provided between the fluorescent material layer 42 and the circular plate 41. Thereby, the rotary fluorescent plate 40 combines a part of the blue pencil of light LB transmitted through the fluorescent material layer 42 and the fluorescent light output from the fluorescent material layer 42, and outputs white light WL toward the pickup system 60.

The pickup system 60 includes a first lens 60a and a second lens 60b, and nearly parallelizes the white light WL output from the rotary fluorescent plate 40. The first lens 60a and the second lens 60b are formed using convex lenses.

The white light WL parallelized by the pickup system 60 enters the first lens array 120. The first lens array 120 has a plurality of first small lenses 121 for dividing the light from the pickup system 60 into a plurality of partial luminous fluxes. The plurality of first small lenses 121 are arranged in a matrix form within a plane orthogonal to an illumination light axis 100ax of the illumination device 100.

The second lens array 130 has a plurality of second small lenses 131 corresponding to the plurality of first small lenses 121 of the first lens array 120. The second lens array 130 forms images of the respective first small lenses 121 of the first lens array 120 near image formation areas of the respective light modulation devices 400R, 400G, 400B with the superimposing lens 150. The plurality of second small lenses 131 are arranged in a matrix form within a plane orthogonal to the illumination light axis 100ax.

The polarization conversion element 140 converts the respective partial luminous fluxes divided by the first lens array 120 into linearly-polarized lights. The polarization conversion element 140 has a polarization separation layer that, of the polarized light components contained in the white light WL output from the illumination device 100, transmits one kind of linearly-polarized light components without change and reflects the other kind of linearly-polarized light components in the direction perpendicular to the illumination light axis 100ax, a reflection layer that reflects the other kind of linearly-polarized light components reflected in the polarization separation layer in the direction parallel to the illumination light axis 100ax, and a retardation film that coverts the other linearly-polarized light components reflected in the reflection layer into the one kind of linearly-polarized light components.

The superimposing lens 150 collects the respective partial luminous fluxes from the polarization conversion element 140 and superimposes the luminous fluxes near the image formation areas of the respective light modulation devices 400R, 400G, and 400B. The first lens array 120, the second lens array 130, and the superimposing lens 150 form an optical integration system that homogenizes the in-plane light intensity distribution of the white light WL from the illumination device 100 in the image formation areas.

Light Source Device

The light source device 2, the collecting lens 3, and the rod lens 4 are explained in detail.

In the embodiment, the light source device 2 includes a light source unit 10 and a collimating system 20.

Figure 2:
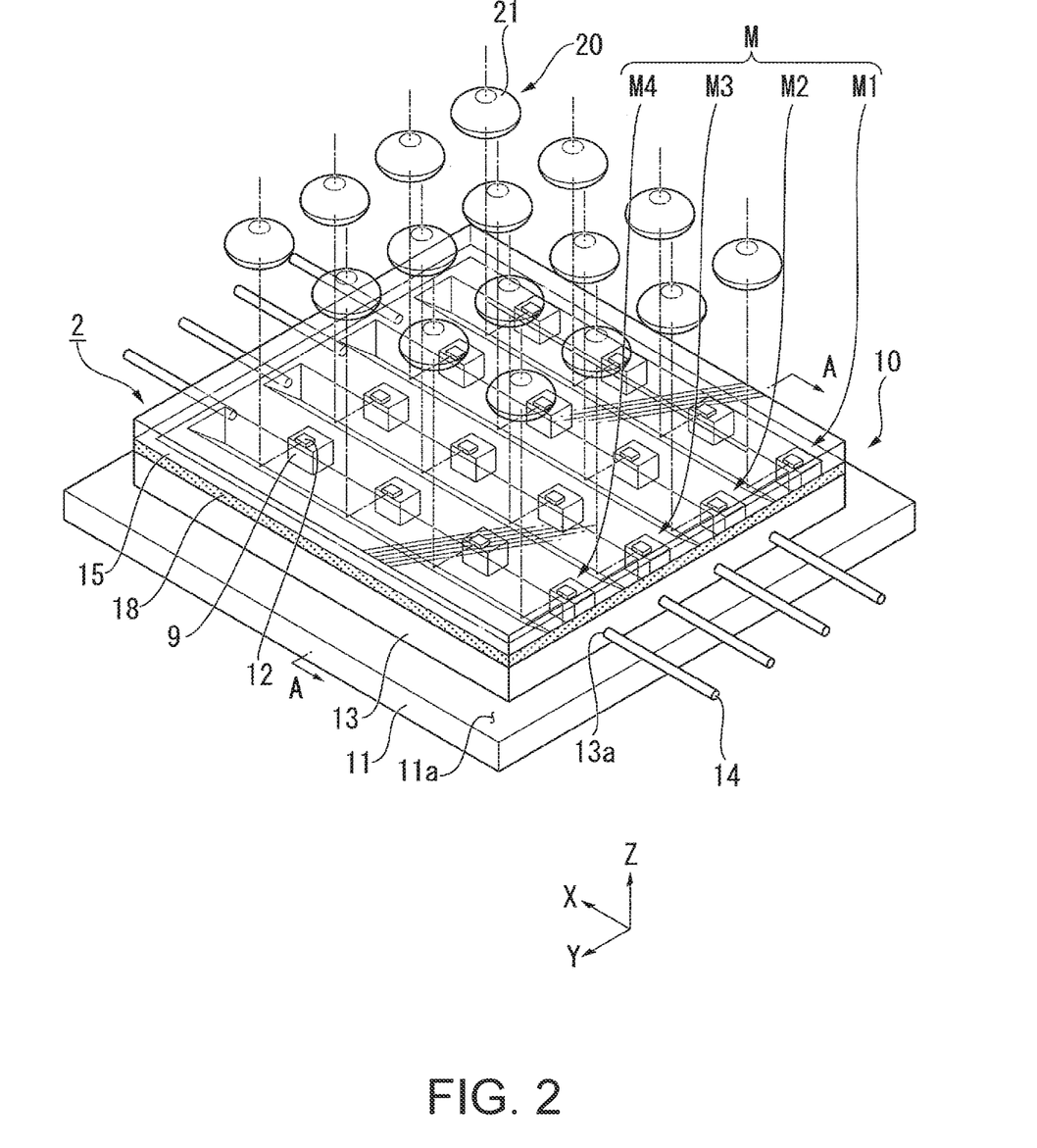
FIG. 2 is a perspective view showing a main part configuration of a light source device 2.
Figure 3:
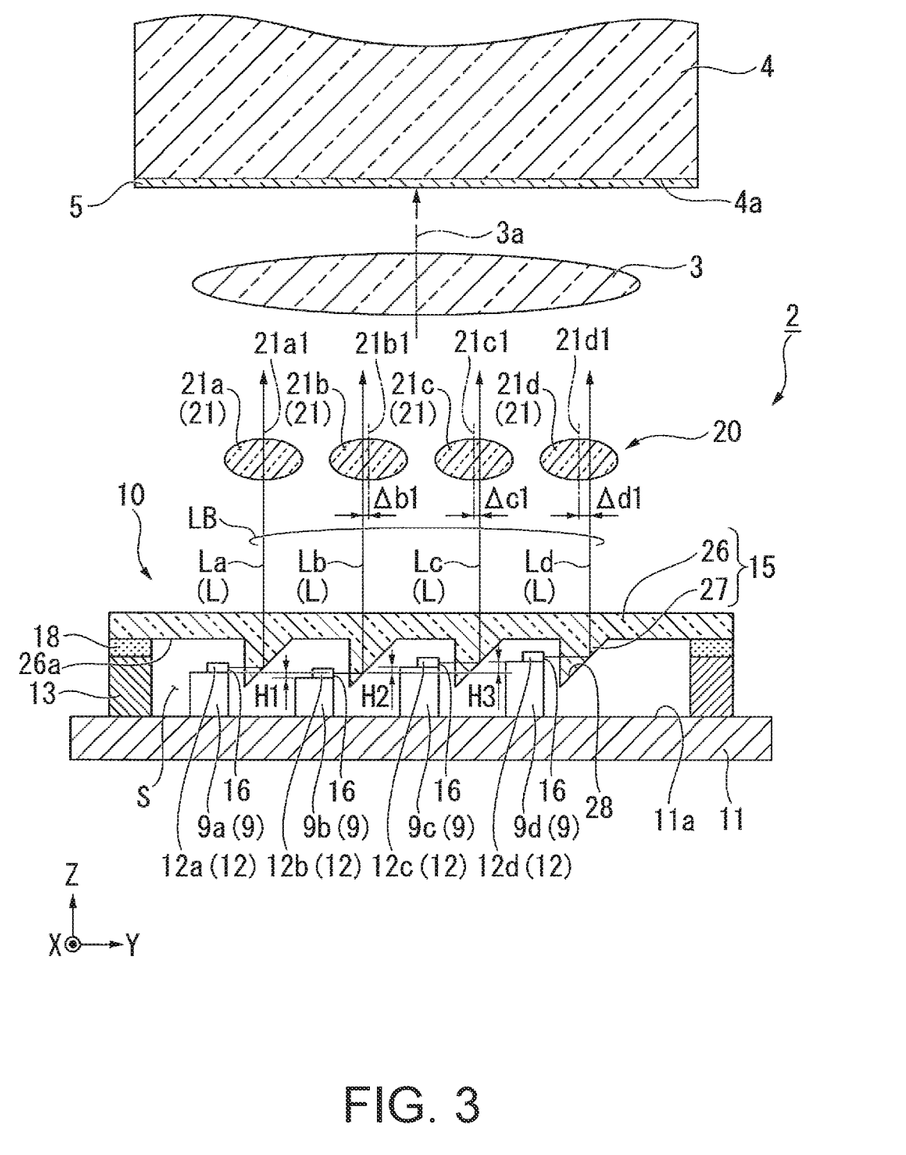
FIG. 3 is a sectional view along line A-A as seen from an arrow direction in FIG. 2.

FIG. 2 is a perspective view showing a configuration of the light source device 2, and FIG. 3 is a sectional view showing a peripheral configuration of the light source device 2. Note that FIG. 3 corresponds to a sectional view along line A-A as seen from an arrow direction in FIG. 2, however, for convenience of explanation, also shows the collecting lens 3 and the rod lens 4.

As shown in FIGS. 2 and 3, the light source unit 10 of the embodiment includes a substrate 11, a plurality of light emitting devices 12, a plurality of supporting members 9, a frame member 13, a plurality of electrodes 14, and a light-transmissive member 15.

Hereinafter, in the explanation using the drawings, an XYZ coordinate system is used. Two directions orthogonal to each other in the plane direction of the substrate 11 are referred to as "X-direction" and "Y-direction" and a direction orthogonal to the X-direction and the Y-direction and parallel to the optical axis of the light output from the light source unit 10 is referred to as "Z-direction".

The substrate 11 has a quadrangular shape such as a nearly square or nearly rectangular shape in the plan view, for example. A first surface 11a on which the light emitting devices 12 are mounted is e.g. a flat surface. Note that a heat dissipation member such as a heatsink may be provided on the opposite surface to the first surface 11a of the substrate 11.

As the material forming the substrate 11, a material having a higher heat dissipation property, e.g. a metal material is used. As the metal material, copper or aluminum is preferable, and copper is used more preferably. The substrate 11 of the metal material is used, and thereby, the substrate has a higher heat dissipation property than a substrate of related art using ceramics as a formation material.

The plurality of light emitting devices 12 are arranged in an array form with respect to the first surface 11a of the substrate 11. In the embodiment, four light emitting devices 12 are arranged in a row along the X-direction, and four of the rows are arranged along the Y-direction. That is, in the embodiment, the 16 light emitting devices 12 in total are arranged with the four light emitting devices respectively in the X-direction and the Y-direction of the substrate 11.

In the following description, the respective rows in which the four light emitting devices 12 are arranged in the X-direction are referred to as "light emitting device rows M1 to M4 (see FIG. 2)". Further, when the respective light emitting device rows M1 to M4 are not distinguished, the light emitting device rows M1 to M4 are collectively and simply referred to as "light emitting device rows M".

As shown in FIG. 3, the light emitting devices 12 are provided on the first surface 11a of the substrate 11 via the supporting members 9. The material of the supporting members 9 is principally e.g. ceramics such as aluminum nitride and alumina. The plurality of light emitting devices 12 are arranged at predetermined intervals from each other along the X-direction and the Y-direction of the substrate 11.

In the embodiment, the light emitting device 12 is a laser light source that outputs a light L. The light emitting device 12 has a light exiting surface 16 that outputs the light L. The planar shape of the light exiting surface 16 is a rectangular shape. The light L output by the light emitting device 12 is e.g. a blue light having a wavelength of 445 nm.

Note that the light emitting device 12 may be a laser light source that outputs a blue light having another wavelength (e.g. 460 nm) than 445 nm. The light exiting surface 16 corresponds to "light emission surface" in the appended claims. In the embodiment, the light exiting surface 16 is located on the +Y-side of the pair of side surfaces of the light emitting device 12 in the Y-direction. The rectangular light exiting surface 16 has a long side along the X-direction and a short side along the Z-direction.

In the embodiment, the light emitting devices 12 are mounted (supported) on the supporting members 9 to output the lights L in the direction in parallel to the first surface 11a (the direction parallel to the XY-plane). For example, the light exiting surfaces 16 of the light emitting devices 12 are provided to nearly coincide with the side surfaces on the +Y-direction sides in the supporting members 9.

The frame member 13 is provided to surround the plurality of light emitting devices 12 on the first surface 11a side of the substrate 11. The frame member 13 is joined onto the first surface 11a of the substrate 11 by e.g. silver solder.

As the material for forming the frame member 13, a material having lower thermal conductivity than the substrate 11 is used. As the material, e.g. kovar is used. A plated layer of e.g. nickel-gold is formed on the surface of the frame member 13.

As described above, the thermal conductivity of the frame member 13 is set to be lower than the thermal conductivity of the substrate 11, and thereby, the heat generated when the light-transmissive member 15 is joined to the frame member 13 is harder to transfer to the light emitting devices 12 via the substrate 11.

As shown in FIG. 2, a plurality of through holes 13a are provided in the frame member 13. In the respective through holes 13a, the electrodes 14 for supplying electric power to the light emitting devices 12 are provided.

The parts between respective through holes 13a and the respective electrodes 14 are sealed using low-melting-point glass or the like.

In the embodiment, the light-transmissive member 15 is provided to face the first surface 11a of the substrate 11. The light-transmissive member 15 is joined to the frame member 13 via a joining material 18. The light-transmissive member 15 has a cover portion 26 and a plurality of prism portions 27.

The cover portion 26 has a rectangular shape along the frame member 13, and closes one opening side of the frame member 13. The cover portion 26 is a plate-like member using a material having light-transmissivity as a formation material. The formation material includes glass such as borosilicate glass, quartz glass, and synthetic quartz glass, quartz crystal, and sapphire.

In the embodiment, a housing space S for housing the plurality of light emitting devices 12 is formed by the cover portion 26, the frame member 13, and the substrate 11. The housing space S is an air-tight space for reduction of adhesion of organic materials and water to the surfaces of the light emitting devices 12.

The housing space S may be under reduced pressure. Or, when the housing space S is not under reduced pressure, it is preferable to fill the space with an inert gas such as nitride gas or dry air. As the inert gas, an industrial high-purity inert gas may be used.

In the embodiment, as shown in FIG. 3, the plurality of prism portions 27 are integrally formed with a lower surface 26a of the cover portion 26 on the substrate 11 side (−Z side). The prism portions 27 are provided with respect to each of the light emitting device rows M provided on the substrate 11 (see FIG. 2), and located in the optical paths of the lights L output from the plurality of light emitting devices 12 forming the corresponding light emitting device rows M. The prism portions 27 extend in the X-direction along the light emitting device rows M. The section (YZ-section) shapes orthogonal to the extension direction in the prism portions 27 are e.g. triangular shapes shown in FIG. 3.

The lights L output from the light emitting devices 12 enter the prism portions 27. The prism portions 27 have reflection surfaces 28 that reflect the entering lights L toward the cover portion 26. Thereby, the lights L output from the light emitting devices 12 along the Y-direction are output from the light source unit 10 along the thickness direction (Z-axis direction) of the light source unit 10 via the cover portion 26.

The respective lights L output from the light source unit 10 enter the collimating system 20.

The collimating system 20 has a plurality of collimating lenses 21. The collimating lenses 21 and the light emitting devices 12 have one-to-one correspondence relationships. Accordingly, the light L output from one certain light emitting device 12 is converted into parallel light by the corresponding collimating lens 21.

In the embodiment, the collimating system 20 is held by a frame member (not shown) and the frame member holds the collimating lenses 21 so that the light emitting devices 12 and the collimating lenses 21 corresponding to each other may have predetermined position relationships. The frame member may be attached to a part of the light source unit 10 or held by another member (casing member) within the illumination device 100.

According to the configuration, the light source device 2 is adapted to output the plurality of parallelized lights L toward the collecting lens 3. The collecting lens 3 collects the respective lights L toward the rod lens 4. Note that, hereinafter, the plurality of lights L may be collectively referred to as "pencil of light LB".

As shown in FIG. 2, the rod lens 4 has a light incident end surface 4a and a light exiting end surface 4b. The light incident end surface 4a is provided on or near a focal plane of the collecting system 30. The planar shapes of the light incident end surface 4a and the light exiting end surface 4b are rectangular shapes.

In the embodiment, the light incident end surface 4a and the light exiting end surface 4b have the same shape. Note that, as long as the light incident end surface 4a and the light exiting end surface 4b have a similarity relationship, for example, the end surfaces may have the so-called tapered rod shapes different in surface area.

The light incident end surface 4a of the rod lens 4 and the light exiting surfaces 16 of the light emitting devices 12 are optically conjugated. Accordingly, the shapes of collection areas formed by the respective lights L output from the rectangular light exiting surface 16 on the light incident end surface 4a of the rod lens 4 are also rectangular shapes.

Figure 4:
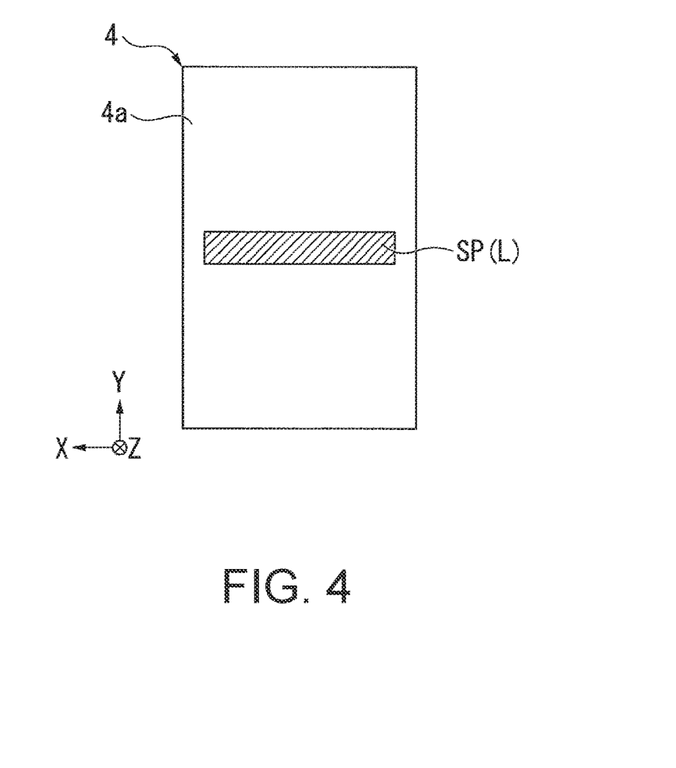
FIG. 4 shows a collection area formed on a light incident end surface of a rod lens in a plan view.

FIG. 4 shows a collection area SP of the light L formed on the light incident end surface 4a of the rod lens 4 in a plan view in the +Z-direction. Note that FIG. 4 shows only the collection area SP formed by the single light L.

As shown in FIG. 4, the light incident end surface 4a of the rod lens 4 has the rectangular shape. In the embodiment, the light source device 2 and the rod lens 4 are placed so that the short side direction of the collection area SP of the light L and the long side direction (Y-direction) of the light incident end surface 4a may be parallel.

In the embodiment, an anti-reflection film 5 is formed on the light incident end surface 4a of the rod lens 4 (see FIG. 3). The anti-reflection film 5 is formed by AR coat for suppressing reflection of the pencil of light LB.

If the intensity of the light entering the light incident end surface 4a of the rod lens 4 is too high, the anti-reflection film 5 formed on the light incident end surface 4a alters. When the anti-reflection film 5 alters, the pencil of light LB is reflected by the light incident end surface 4a and not introduced into the rod lens 4, and loss may be produced and reduction of light use efficiency may be caused.

On the other hand, in the light source device 2 of the embodiment, the positions of the collection areas of the lights L output from the light emitting devices 12 are separated so that the collection areas may not superimposed on a single point on the light incident end surface 4a of the rod lens 4.

Thereby, compared to the case where the plurality of collection areas are superimposed on a single point, the incident positions of the collection areas are distributed so that the lights L may not be concentrated on a specific area in the light incident end surface 4a and the intensity of lights on the light incident end surface 4a may be homogenized.

As below, the configuration for distributing the formation positions of the collection areas SP of the lights L on the light incident end surface 4a of the rod lens 4 will be explained.

As shown in FIGS. 3 and 4, the rod lens 4 is placed with respect to the light source device 2 so that the long side direction of the light incident end surface 4a may coincide with the Y-direction and the short side direction of the light incident end surface 4a may coincide with the X-direction.

In FIG. 3, the light emitting devices 12 arranged along the +Y-direction are sequentially referred to as "light emitting device 12a", "light emitting device 12b", "light emitting device 12c", and "light emitting device 12d" and the lights output from the respective light emitting devices 12a to 12d are referred to as lights La, Lb, Lc, Ld, respectively. In FIG. 3, only the principal rays of the respective lights La to Ld are shown.

Further, the supporting members 9 that support these light emitting devices 12a to 12d are referred to as "supporting member 9a", "supporting member 9b", "supporting member 9c", and "supporting member 9d", respectively. Furthermore, the collimating lenses 21 corresponding to the light emitting devices 12a to 12d are referred to as "collimating lens 21a", "collimating lens 21b", "collimating lens 21c", and "collimating lens 21d", respectively.

As shown in FIG. 3, the respective collimating lenses 21a to 21d have optical axes 21a1, 21b1, 21c1, and 21d1, respectively. The optical axes 21a1 to 21d1 are axes passing through the centers of the respective collimating lenses 21a to 21d.

In the embodiment, the placement intervals of the respective collimating lenses 21a to 21d in the X-direction and the Y-direction are fixed and the placement intervals of the collimating lenses 12a to 12d in the X-direction and the Y-direction are fixed. The prism portions 27 and the respective collimating lenses 21a to 21d are placed to reflect the lights La to Ld entering the reflection surfaces 28 of the prism portions 27 along the respective optical axes 21a1 to 21d1.

In the embodiment, the thicknesses or heights (sizes in the Z-direction) of the supporting members 9a to 9d are made different. Thereby, the incident positions of the respective lights La to Ld to the reflection surfaces 28 of the prism portions 27 are made different.

The light La enters the reflection surface 28 and is reflected to enter onto the optical axis 21a1 of the collimating lens 21a.

The height of the supporting member 9b is smaller than the height of the supporting member 9a by H1, and the light Lb entering a position separated from the incident position of the light La of the reflection surface 28 toward the −Y-side by Δb1 is reflected to enter a position separated from the optical axis 21b1 of the collimating lens 21b toward the −Y-side by Δb1.

The height of the supporting member 9c is smaller than the height of the supporting member 9a by H2, and the light Lc entering a position separated from the incident position of the light La of the reflection surface 28 toward the +Y-side by Δc1 is reflected to enter a position separated from the optical axis 21c1 of the collimating lens 21c toward the +Y-side by Δc1.

The height of the supporting member 9d is smaller than the height of the supporting member 9a by H3, and the light Ld entering a position separated from the incident position of the light La of the reflection surface 28 toward the +Y-side by Δd1 is reflected to enter a position separated from the optical axis 21d1 of the collimating lens 21d toward the +Y-side by Δd1.

According to the configuration, in the embodiment, the position relationships between the respective lights La to Ld and the respective optical axes 21a1 to 21d1 are made different in the Y-direction.

The respective lights La to Ld pass through the collimating lenses 21a to 21d and are converted into parallel lights. Note that the light La passing through the collimating lens 21a travels along the optical axis 21a1 and is not refracted by the collimating lens 21a.

On the other hand, the lights Lb to Ld enter the positions separated from the optical axes 21b1 to 21d1 and are refracted by the respective collimating lenses 21b to 21d. Accordingly, the respective lights La to Ld passing through the collimating lenses 21a to 21d enter at different angles with respect to the optical axis 3a (see FIG. 3) of the collecting lens 3.

As a result, the respective lights La to Ld are collected to different positions in the Y-direction on the light incident end surface 4a by the collecting lens 3. Therefore, the positions of the collection areas SP formed on the light incident end surface 4a by the respective lights La to Ld are separated from one another.

Figure 5:
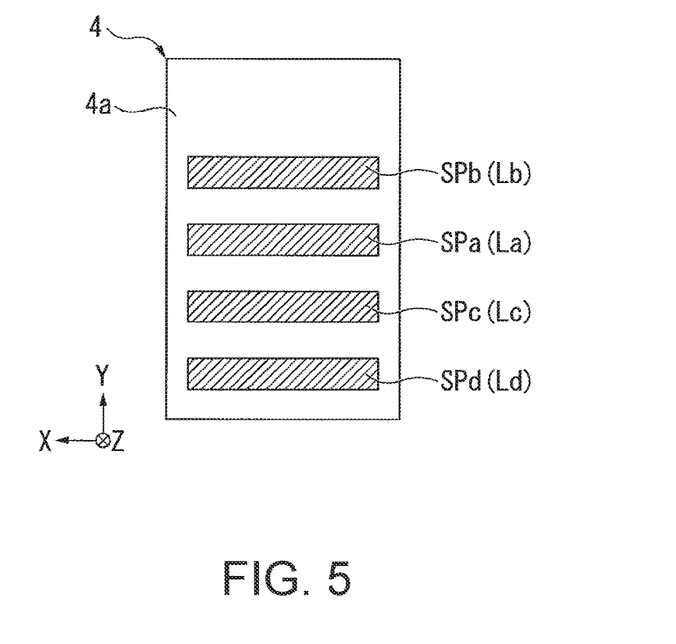
FIG. 5 shows collection areas formed on the light incident end surface of the rod lens in the plan view.

FIG. 5 shows the respective collection areas SP formed on the light incident end surface 4a in the plan view. In FIG. 5, the collection areas SPa, SPb, SPc, SPd correspond to the respective collection areas formed on the light incident end surface 4a by the respective lights La, Lb, Lc, Ld.

As shown in FIG. 5, the positions of the collection areas SPa to SPd of the respective lights La to Ld are separated in the long side direction (Y-direction) of the light incident end surface 4a. In the embodiment, the collection areas SPa to SPd are moved in the long side direction (Y-direction) of the light incident end surface 4a, and thereby, the amounts of movement of the respective collection areas SPa to SPd may be taken to be larger while formation of the collection area SP in another part than the light incident end surface 4a is prevented. Therefore, on the light incident end surface 4a, a state without overlapping among the respective collection areas SPa to SPd may realized.

In the above description, part of the lights L (lights La to Ld) output from the plurality of light emitting devices 12 are described, however, the same applies to the other lights L. To suppress concentration of the light intensity on one location in the light incident end surface 4a, overlapping among the collection areas formed by the respective lights L output from the plurality of light emitting devices 12 may be suppressed.

As below, advantages of the first embodiment will be described.

In the embodiment, the collection areas SP formed on the light incident end surface 4a by the respective lights L output from the light emitting devices 12 are separated in the long side direction of the light incident end surface 4a, and thereby, the collection areas SP do not overlap in one location on the light incident end surface 4a. That is, the positions of the collection areas (16 collection areas) formed on the light incident end surface 4a by the respective lights L output from the plurality of light emitting devices 12 are made different in the Y-direction. In this manner, overlapping among the collection areas may be suppressed on the light incident end surface 4a, and thus, concentration of the lights L on a specific area on the light incident end surface 4a may be prevented and the intensity of the lights on the light incident end surface 4a may be averaged.

Note that it is more preferable that all of the positions of the collection areas (16 collection areas) formed on the light incident end surface 4a by the respective lights L output from the plurality of light emitting devices 12 are made different in the Y-direction. In this manner, overlapping among all of the collection areas may be suppressed on the light incident end surface 4a, and thus, the intensity of the lights on the light incident end surface 4a may be further averaged.

According to the embodiment, the intensity of the lights on the light incident end surface 4a is averaged, and thereby, alteration of the anti-reflection film 5 formed on the light incident end surface 4a may be suppressed. Therefore, reduction of light use efficiency due to the alteration of the anti-reflection film 5 may be suppressed.

The pencil of light LB (the plurality of lights L) entering the light incident end surface 4a of the rod lens 4 is totally reflected inside of the rod lens 4 and propagated, and output from the light exiting end surface 4b. Thereby, the in-plane intensity distribution of the lights (pencil of light LB) output from the light exiting end surface 4b is homogenized. The pencil of light LB with the in-plane intensity distribution homogenized by the rod lens 4 enters the collecting system 30.

As described above, according to the illumination device 100 of the embodiment, the light source device 2 is provided, and thereby, with secured reliability of the anti-reflection film 5 provided on the light incident end surface 4a of the rod lens 4, the pencil of light LB may be stably radiated to the rod lens 4 and the white light WL may be stably generated. Therefore, according to the projector 1 of the embodiment, the illumination device 100 is provided, and thereby, images with stable brightness may be projected.

First Modified Example

In the above described embodiment, the thicknesses of the supporting members 9a to 9d are made different, and thereby, the formation positions of the collection areas on the light incident end surface 4a are made different. However, the invention is not limited to that.

Figure 6:
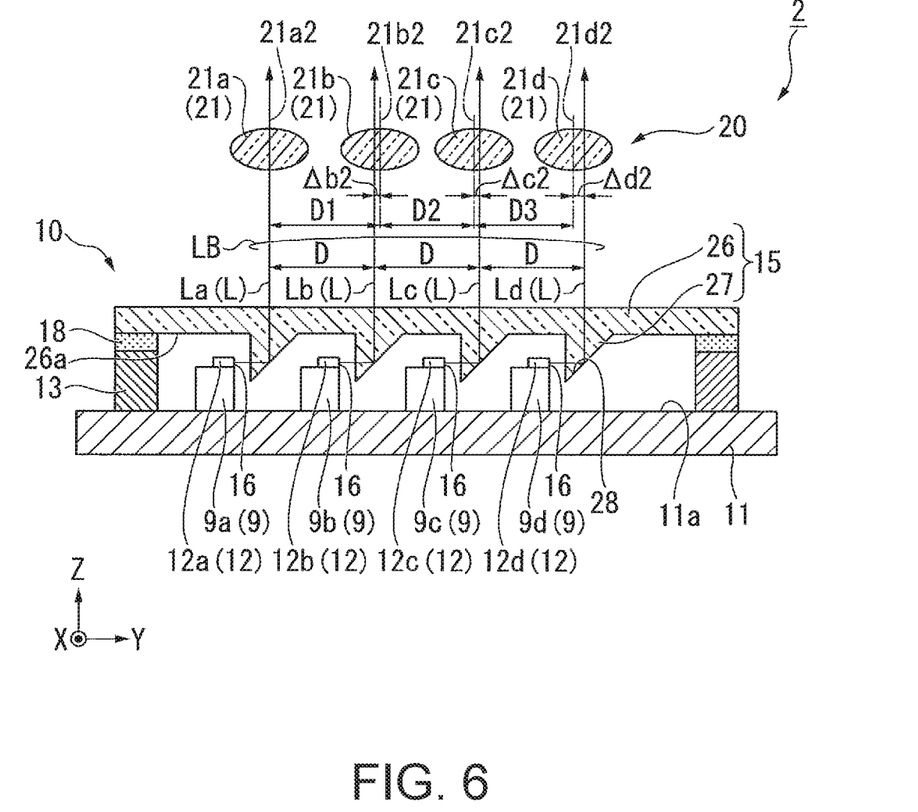
FIG. 6 shows a main part configuration of a light source device according to a first modified example.

For example, as shown in FIG. 6, distances D1, D2, D3 in the Y-direction in which the respective collimating lenses 21a to 21d are arranged are respectively made different, and thereby, the position relationships between the respective lights La to Ld and respective optical axes 21a2 to 21d2 may be made different.

Note that, in the modified example, the placement intervals of the light emitting devices 12a to 12d in the X-direction and the Y-direction are fixed. Further, the thicknesses or heights (sizes in the Z-direction) of the supporting members 9a to 9d are the same. Therefore, regarding the respective lights La to Ld, the distances from the incident positions to the reflection surfaces 28 of the prism portions 27 to the light exiting surfaces 16 in the Y-direction are the same as one another. The distances D between the prism portions 27 in the Y-direction are the same as one another.

The light La enters the reflection surface 28 and is reflected to enter onto the optical axis 21a2 of the collimating lens 21a.

The distance D1 of the collimating lens 21b with respect to the collimating lens 21a in the Y-direction is larger than the distance D between the prism portions 27 in the Y-direction by Δb2, and thus, the light Lb reflected by the reflection surface 28 enters a position separated from the optical axis 21b2 of the collimating lens 21b toward the −Y-side by Δb2.

The distance D2 of the collimating lens 21c with respect to the collimating lens 21b in the Y-direction is smaller than the distance D between the prism portions 27 in the Y-direction by Δb2+Δc2, and the light Lc reflected by the reflection surface 28 enters a position separated from the optical axis 21c2 of the collimating lens 21c toward the +Y-side by Δc2.

The distance D3 of the collimating lens 21d with respect to the collimating lens 21c in the Y-direction is smaller than the distance D between the prism portions 27 in the Y-direction by Δd2−Δc2, and the light Ld reflected by the reflection surface 28 enters a position separated from the optical axis 21d2 of the collimating lens 21d toward the +Y-side by Δd2.

Also, in the configuration, the positions of the collection areas SPa to SPd formed on the light incident end surface 4a by the respective lights La to Ld may be separated (see FIG. 5). Therefore, overlapping among the collection areas may be suppressed on the light incident end surface 4a, and thus, concentration of the lights L on a specific area on the light incident end surface 4a may be prevented and the intensity of the lights on the light incident end surface 4a may be averaged.

According to the modified example, the intensity of the lights on the light incident end surface 4a may be averaged without influence on the configuration of the light source unit 10.

Second Modified Example

Figure 7:
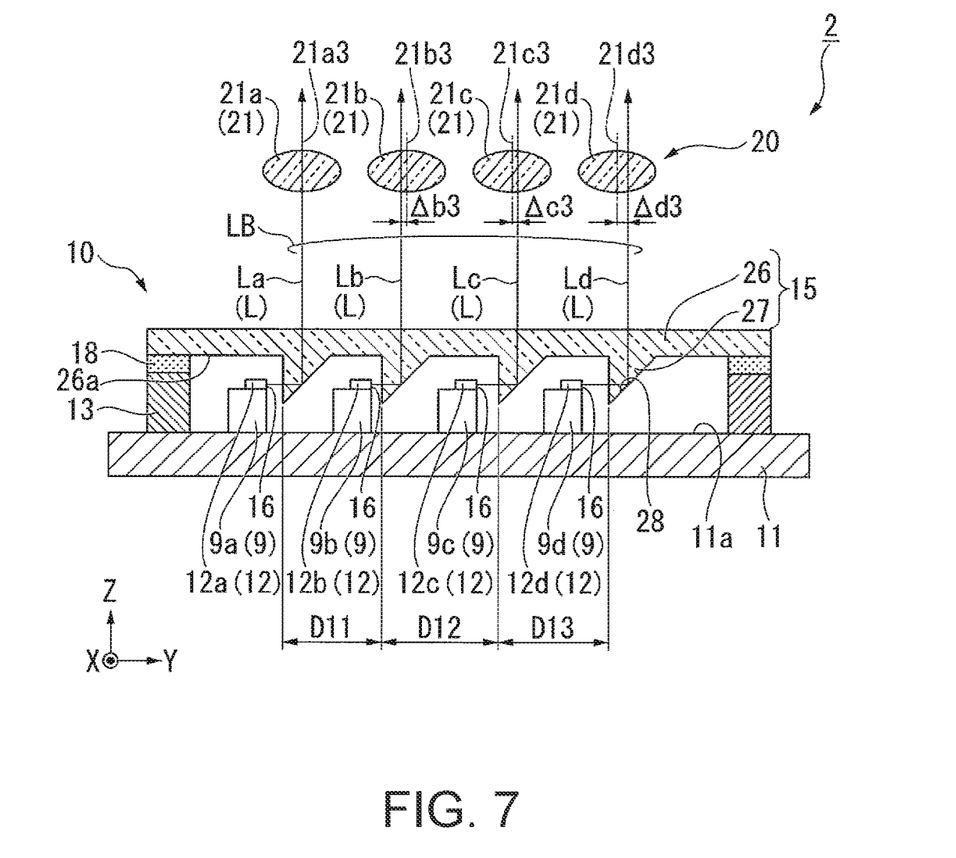
FIG. 7 shows a main part configuration of a light source device according to a second modified example.

Or, as shown in FIG. 7, distances D11, D12, D13 between the respective prism portions 27 in the Y-direction are respectively made different, and thereby, the position relationships between the respective lights La to Ld and respective optical axes 21a3 to 21d3 may be made different.

Note that, in the modified example, the placement intervals of the light emitting devices 12a to 12d in the X-direction and the Y-direction are fixed. Further, the thicknesses or heights (sizes in the Z-direction) of the supporting members 9a to 9d are the same.

The light La enters the reflection surface 28 and is reflected to enter onto the optical axis 21a3 of the collimating lens 21a.

The distance D11 of the prism portion 27 reflecting the light Lb with respect to the prism portion 27 reflecting the light La in the Y-direction is smaller than the distance of the collimating lens 21b with respect to the collimating lens 21a in the Y-direction (the distance between the optical axis 21a3 of the collimating lens 21a and the optical axis 21b3 of the collimating lens 21b in the Y-direction), and thus, the light Lb reflected by the reflection surface 28 enters a position separated from the optical axis 21b3 of the collimating lens 21b toward the −Y-side by Δb3.

The distance D12 of the prism portion 27 reflecting the light Lc with respect to the prism portion 27 reflecting the light Lb in the Y-direction is larger than the distance of the collimating lens 21c with respect to the collimating lens 21b in the Y-direction (the distance between the optical axis 21b3 of the collimating lens 21b and the optical axis 21c3 of the collimating lens 21c in the Y-direction), and thus, the light Lc reflected by the reflection surface 28 enters a position separated from the optical axis 21c3 of the collimating lens 21c toward the +Y-side by Δc3.

The distance D13 of the prism portion 27 reflecting the light Ld with respect to the prism portion 27 reflecting the light Lc in the Y-direction is smaller than the distance of the collimating lens 21d with respect to the collimating lens 21c in the Y-direction (the distance between the optical axis 21c3 of the collimating lens 21c and the optical axis 21d3 of the collimating lens 21d in the Y-direction), and thus, the light Ld reflected by the reflection surface 28 enters a position separated from the optical axis 21d3 of the collimating lens 21d toward the +Y-side by Δd3.

According to the modified example, the intensity of the lights on the light incident end surface 4a may be averaged only by making the distances between the prism portions 27 of the light-transmissive member 15 in the Y-direction different.

Also, in the configuration, the positions of the collection areas SPa to SPd formed on the light incident end surface 4a by the respective lights La to Ld may be separated (see FIG. 5). Therefore, overlapping among the collection areas may be suppressed on the light incident end surface 4a, and thus, concentration of the lights L on a specific area on the light incident end surface 4a may be prevented and the intensity of the lights on the light incident end surface 4a may be averaged.

Third Modified Example

In the above described embodiment, the case where the output directions of the lights L output from the light emitting devices 12 are changed using the prism portions 27 provided in the light-transmissive member 15 is taken as an example, however, the invention is not limited to that.

Figure 8:
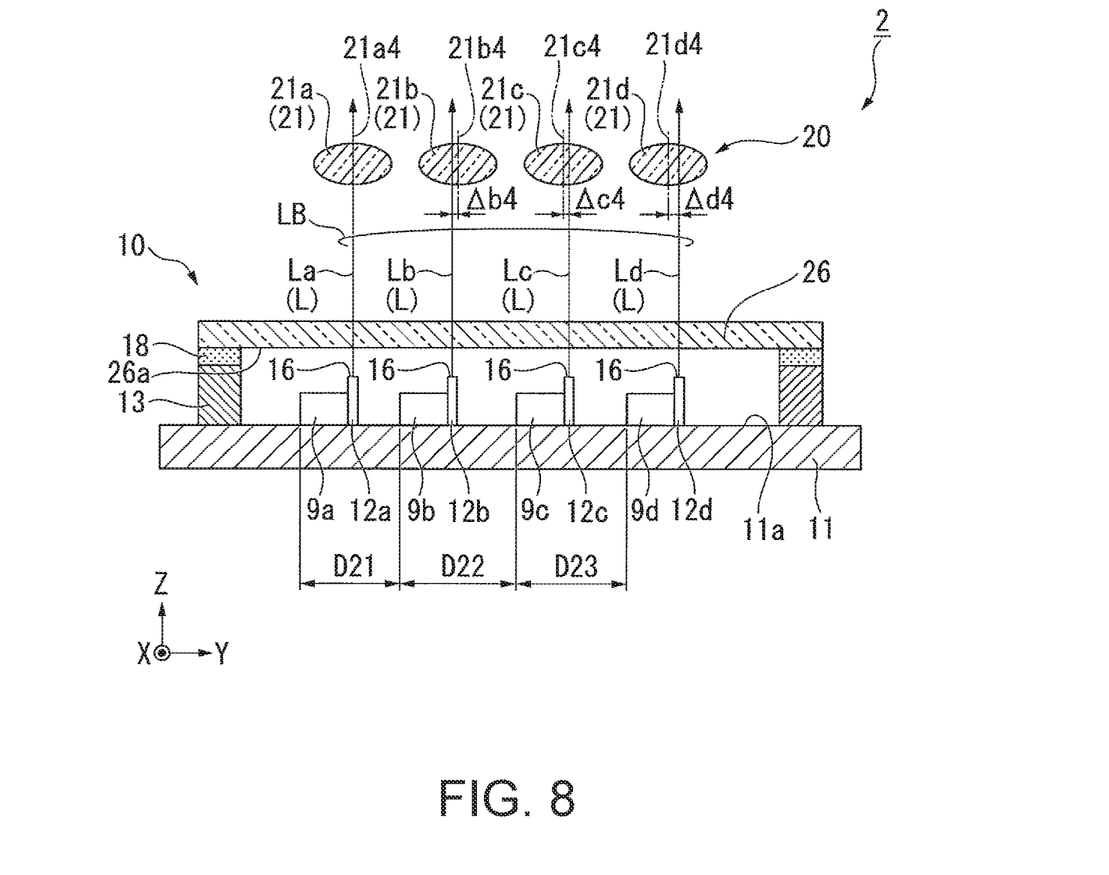
FIG. 8 shows a main part configuration of a light source device according to a third modified example.

For example, as shown in FIG. 8, the light emitting devices 12 are mounted on the side surfaces of the supporting members 9 so that the light exiting surfaces 16 may face upward (+Z-direction). According to the configuration, the light exiting surfaces 16 are placed to face the collimating lenses 21 and the prism portions 27 are unnecessary.

Further, in the configuration shown in FIG. 8, distances D21, D22, D23 in the Y-direction in which the respective supporting members 9a to 9d are arranged are respectively made different, and thereby, the position relationships between the respective lights La to Ld and respective optical axes 21a4 to 21d4 may be made different. Note that, in the modified example, the placement intervals of the light emitting devices 12a to 12d in the X-direction are fixed.

The light La is output from the light exiting surface 16 and is reflected to enter onto the optical axis 21a4 of the collimating lens 21a.

The distance D21 of the supporting member 9b (light emitting device 12b) with respect to the supporting member 9a (light emitting device 12a) in the Y-direction is smaller than the distance of the collimating lens 21b with respect to the collimating lens 21a in the Y-direction (the distance between the optical axis 21a4 of the collimating lens 21a and the optical axis 21b4 of the collimating lens 21b in the Y-direction), and thus, the light Lb output from the light emitting device 12b enters a position separated from the optical axis 21b4 of the collimating lens 21b toward the −Y-side by Δb4.

The distance D22 of the supporting member 9c (light emitting device 12c) with respect to the supporting member 9b (light emitting device 12b) in the Y-direction is larger than the distance of the collimating lens 21c with respect to the collimating lens 21b in the Y-direction (the distance between the optical axis 21b4 of the collimating lens 21b and the optical axis 21c4 of the collimating lens 21c in the Y-direction), and thus, the light Lc output from the light emitting device 12c enters a position separated from the optical axis 21c4 of the collimating lens 21c toward the +Y-side by Δc4.

The distance D23 of the supporting member 9d (light emitting device 12d) with respect to the supporting member 9c (light emitting device 12c) in the Y-direction is larger than the distance of the collimating lens 21d with respect to the collimating lens 21c in the Y-direction (the distance between the optical axis 21c4 of the collimating lens 21c and the optical axis 21d4 of the collimating lens 21d in the Y-direction), and thus, the light Ld output from the light emitting device 12d enters a position separated from the optical axis 21d4 of the collimating lens 21d toward the +Y-side by Δd4.

Also, in the configuration, the positions of the collection areas SPa to SPd formed on the light incident end surface 4a by the respective lights La to Ld may be separated (see FIG. 5). Therefore, overlapping among the collection areas may be suppressed on the light incident end surface 4a, and thus, concentration of the lights L on a specific area on the light incident end surface 4a may be prevented and the intensity of the lights on the light incident end surface 4a may be averaged.

Note that the light emitting devices 12 may be mounted directly on the first surface 11a of the substrate 11 without using the supporting members 9. In this case, the distances in the Y-direction at which the respective light emitting devices 12 are mounted are respectively made different, and thereby, the position relationships between the respective lights La to Ld and respective optical axes 21a4 to 21d4 may be made different.

Second Embodiment

Subsequently, a projector according to the second embodiment will be explained. The projector of the embodiment is largely different from the projector 1 of the first embodiment in that a micromirror light modulation device is used. As below, the configurations and members in common with the first embodiment have the same signs and their detailed description will be omitted or simplified.

Figure 9:
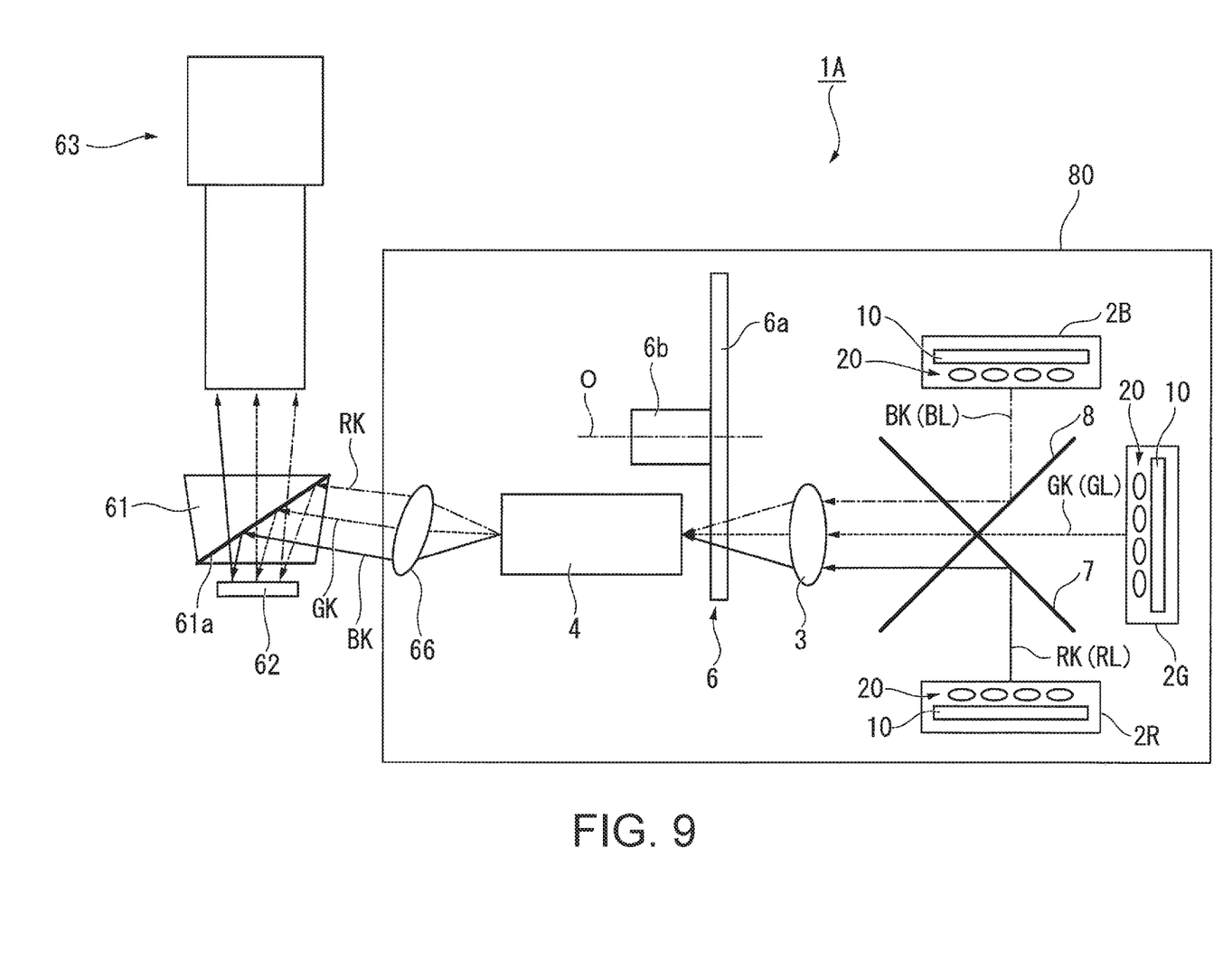
FIG. 9 shows a schematic configuration of a projector according to the second embodiment.

FIG. 9 shows a schematic configuration of the projector according to the embodiment.

As shown in FIG. 9, a projector 1A of the embodiment includes an illumination device 80, a total reflection prism 61, a micromirror light modulation device 62, and a projection system 63.

The illumination device 80 includes a first light source device 2R, a second light source device 2G, a third light source device 2B, a first dichroic film 7, a second dichroic film 8, the collecting lens 3, a rotary diffusion plate 6, the rod lens 4, and a light guiding system 66.

The first light source device 2R basically has the same configuration as the light source device 2 of the first embodiment. That is, the first light source device 2R includes the light source unit 10 and the collimating system 20. The light source unit 10 of the embodiment is different only in that laser light sources that output red lights are used as the light emitting devices 12.

The second light source device 2G basically has the same configuration as the first light source device 2R and is different only in that laser light sources that output green lights are used as the light emitting devices 12. Further, the third light source device 2B has the same configuration as the light source device 2 of the first embodiment.

In the embodiment, the first light source device 2R outputs a pencil of red light RK including a plurality of red lights RL, the second light source device 2G outputs a pencil of green light GK including a plurality of green lights GL, and the third light source device 2B outputs a pencil of blue light BK including a plurality of blue lights BL.

The first dichroic film 7 has an optical property of reflecting only the pencil of red light RK output from the first light source device 2R and transmitting the pencil of green light GK and the pencil of blue light BK output from the second light source device 2G and the third light source device 2B.

The second dichroic film 8 has an optical property of reflecting only the pencil of blue light BK output from the third light source device 2B and transmitting the pencil of red light RK and the pencil of green light GK output from the first light source device 2R and the second light source device 2G.

According to the configuration, the pencil of red light RK is reflected by the first dichroic film 7 and enters the collecting lens 3, the pencil of green light GK is transmitted through the first dichroic film 7 and the second dichroic film 8 and enters the collecting lens 3, and the pencil of blue light BK is reflected by the second dichroic film 8 and enters the collecting lens 3.

The collecting lens 3 collects the pencil of red light RK, the pencil of green light GK, and the pencil of blue light BK on the light incident end surface 4a of the rod lens 4 via the rotary diffusion plate 6.

The rotary diffusion plate 6 includes a diffusion plate 6a and a motor 6b that rotates the diffusion plate 6a about a predetermined rotation axis O. The diffusion plate 6a includes a substrate having e.g. a concavo-convex structure. As the concavo-convex structure, a microlens, concavities and convexities formed by blasting, diffractive element, or the like may be exemplified.

The rotary diffusion plate 6 rotates the diffusion plate 6a about the rotation axis O, and thereby, temporally changes the diffusion states of the lights (pencil of red light RK, the pencil of green light GK, and the pencil of blue light BK) transmitted through the diffusion plate 6a. That is, according to the configuration of the embodiment, the speckle pattern temporally changes. The time-averaged speckle pattern is recognized by an observer, and thereby, the speckle noise is less visible than that in the case where the diffusion plate 6a is not rotated. Further, the rotary diffusion plate 6 may reduce interference unevenness due to use of laser beams.

According to the embodiment, with suppressed alteration of the anti-reflection film 5 provided on the light incident end surface 4a of the rod lens 4, the respective lights may be stably radiated to the rod lens 4.

The pencil of red light RK, the pencil of green light GK, and the pencil of blue light BK having the homogenized intensity distributions via the rod lens 4 enter the light guiding system 66. The light guiding system 66 outputs the pencil of red light RK, the pencil of green light GK, and the pencil of blue light BK toward the total reflection prism 61.

The illumination device 80 of the embodiment time-sequentially outputs the pencil of red light RK, the pencil of green light GK, and the pencil of blue light BK toward the total reflection prism 61.

The total reflection prism 61 includes a light-transmissive member and contains a total reflection surface 61a. The angle of the total reflection surface 61a is set to totally reflect the lights (the pencil of red light RK, the pencil of green light GK, and the pencil of blue light BK) from the illumination device 80 toward the micromirror light modulation device 62.

The micromirror light modulation device 62 includes e.g. a DMD (Digital Micromirror Device). The DMD includes a plurality of micromirrors arranged in a matrix form. The DMD changes the tilt directions of the plurality of micromirrors, and thereby, changes the reflection direction of the incident light between the direction in which the light is transmitted through the total reflection surface 61a and the direction in which the light is reflected by the total reflection surface 61a.

As described above, the DMD sequentially modulates the red lights (pencil of red light RK), the green lights (pencil of green light GK), and the blue lights (pencil of blue light BK) output from the illumination device 80 and generates a green image, a red image, and a blue image. The projection system 63 projects the green image, the red image, and the blue image on a screen (not shown).

As below, advantages of the second embodiment will be described.

As described above, according to the projector 1A of the embodiment, the first light source device 2R, the second light source device 2G, and the third light source device 2B are provided, and thereby, a color image having stable brightness may be projected.

In the projector 1A of the system using the DMD like the embodiment, the rod lens 4 may be placed with a tilt. When the rod lens 4 is tilted, the light incident end surface 4a turns, and the first light source device 2R, the second light source device 2G, and the third light source device 2B are respectively placed with tilts according to the tilt of the light incident end surface 4a. Thereby, the long side of the light incident end surface 4a and the short sides of the collection areas remain parallel. That is, the orientations of the collection areas formed on the light incident end surface 4a no longer change. Accordingly, the lights from the respective light source devices 2R, 2G, 2B may be efficiently entered into the light incident end surface 4a.

Note that the invention is not limited to the details of the above described embodiments, but can be appropriately changed without departing from the scope of the invention.

For example, the collimating system 20 may be integrally formed with the light source unit 10. That is, the plurality of collimating lenses 21 forming the collimating system 20 may be integrally formed with the light-transmissive member 15 (cover portion 26) of the light source unit 10.

In the above described embodiments, the example of applying the illumination device according to the invention to the projector is shown, however, the invention is not limited to that. The illumination device according to the invention may be applied to lighting equipment such as headlights for automobile.

The entire disclosure of Japanese Patent Application No. 2017-027922, filed on Feb. 17, 2017 is expressly incorporated by reference herein.

What is claimed is:

1. An illumination device comprising:
   a light source unit including a plurality of light emitting devices having light emission surfaces, the light emitting devices being spaced apart from adjacent light emitting devices in a direction orthogonal to an optical axis of a light output from the light source unit by uniform intervals;
   a collimating system having a plurality of collimating lenses provided to respectively correspond to the plurality of light emitting devices of the light source unit, into which lights from the respective light emitting devices enter, the collimating lenses being spaced apart from adjacent collimating lenses in the direction by intervals, at least one interval being different from at least one other interval;
   a collecting lens into which the lights output from the plurality of collimating lenses enter; and
   a rod lens having a light incident end surface into which the light collected by the collecting lens enters,
   wherein the light source unit and the collimating system are adapted so that a principal ray of the light output from the light emission surface corresponding to a part of the plurality of light emitting devices of the light source unit may enter a position separated from an optical axis of the collimating lens corresponding to the part of the plurality of light emitting devices of the light source unit, and
   a first interval between a first collimating lens and a second collimating lens is longer than the uniform intervals and a second interval between a third collimating lens and a fourth collimating lens is shorter than the uniform intervals.

2. The illumination device according to claim 1, wherein the light source unit further has a substrate and a plurality of supporting members provided on the substrate and respectively supporting the plurality of light emitting devices.

3. A projector comprising:
   the illumination device according to claim 2;
   a light modulation device that modulates a light from the illumination device according to image information to form an image light; and
   a projection system that projects the image light.

4. The illumination device according to claim 1, wherein the light source unit and the rod lens are placed so that a short side direction of a plurality of collection areas formed on the light incident end surface in a rectangular shape by the lights output from the respective light emission surfaces in rectangular shapes and a long side direction of the light incident end surface may be parallel.

5. A projector comprising:
   the illumination device according to claim 4;
   a light modulation device that modulates a light from the illumination device according to image information to form an image light; and
   a projection system that projects the image light.

6. A projector comprising:
   the illumination device according to claim 1;
   a light modulation device that modulates a light from the illumination device according to image information to form an image light; and
   a projection system that projects the image light.

7. The illumination device according to claim 1, wherein a third interval between the second collimating lens and the third collimating lens is shorter than the uniform intervals.

* * * * *